United States Patent Office 3,576,791
Patented Apr. 27, 1971

3,576,791
POLYSULFONES
Howard V. Holler, Oakland, and Edward A. Youngman, Modesto, Calif., assignors to Shell Oil Company, New York, N.Y.
No Drawing. Continuation-in-part of application Ser. No. 545,559, Apr. 27, 1966. This appplication July 10, 1969, Ser. No. 840,825
Int. Cl. C08f 27/24, 13/06
U.S. Cl. 260—79.3    5 Claims

ABSTRACT OF THE DISCLOSURE

Reaction products according to this invention are polysulfones of diolefins and $SO_2$ in which the molar ratio of diolefin-derived monomer units to —$SO_2$— is greater than 1.2:2, and their hydrogenation products. Polysulfones of this invention exhibit greater solubility in solvents such as phenols, compared to polysulfones containing hydrocarbon-derived and —$SO_2$— units in 1:1 ratio in a perfectly alternating structure.

---

This application is a continuation-in-part of Ser. No. 545,559, filed Apr. 27, 1966, now abandoned.

This invention relates to novel polysulfones.

Hydrogenated copolymers of a conjugated diene and sulfur dioxide and hydrogenated terpolymers of a conjugated diene, sulfur dioxide and an ethylenically unsaturated hydrocarbon are highly stable and valuable polymers. These polymers are useful in preparing films, moldings, coatings, etc. A number of the stable polysulfones of this group are also highly crystalline and thus useful in preparing fibers for textiles, carpets, etc. Such polysulfones are described in U.S. Pats. 3,336,272, 3,336,273 and 3,336,274 to Youngman et al. As explained in said patents, such polylsulfones have the repeating structural units (I)    $\{MSO_2\}$ wherein M represents a unit derived from a single organic monomer molecule, except in the case of those polymers in which vinyl chloride or a vinyl aromatic compound is copolymerized with a diolefin and $SO_2$, in which case more than a single organic monomer unit may be present between —$SO_2$— groups.

There have now been discovered novel polysulfones characterized by the repeating structrual units (II)    $\{M'SO_2\}$ where M' is a hydrocarbon unit derived by the enchainment of an average of 1.2 or more hydrocarbon monomer units of a conjugated diolefin. The novel polysulfones of this invention are copolymers of a conjugated diolefin and sulfur dioxide.

The conjugated diolefin monomers used in preparing the polymers of the invention are those having from 4 to about 8 carbon atoms such as 1,3-butadiene, isoprene, piperylene, 1,3-hexadiene, 2,4-hexadiene, cyclopentadiene, cyclohexadiene, cyclooctadiene, etc. Butadiene is preferred.

The polysulfones prepared by polymerization of sulfur dioxide and the hydrocarbon monomers set forth above and as defined in Formula II are unsaturated products. These polymers, although having high molecular weights, are somewhat unstable both chemically and thermally; they are degraded by mild bases as well as by moderately high temperatures, thereby being rendered unsuitable for many desirable applications. However, the unsaturated polymers may be hydrogenated to form quite stable derivatives which are generally useful in preparing molded products, films, fibers, etc.

The polymers of the invention are best described as having the repeating structural unit (III)    $\{M_n\text{—}SO_2\}$ In these polysulfones, M is the combined form of a single conjugated diene of from 4 to about 8 carbon atoms per diene unit. It has one ethylenically unsaturated site per diene unit. The double bond occurs predominantly in the polymer chains, as further explained below. In Formula III, $n$ is a number, the average of which in a single polymer molecule is equal to or greater than 1.2 and preferably less than about 20.

The polymers of this invention may be prepared by a number of different methods such as emulsion, suspension, etc., the critical feature of each method being that the sulfur dioxide concentration in the reaction medium is maintained at or below a certain level which level varies depending on the temperature and with the particular hydrocarbon monomer or monomers used. In general, the maximum concentration of sulfur dioxide present in the reaction mixture relative to the hydrocarbon monomer concentration may be expressed as $$\mathrm{Log}\left(\frac{[M]}{[SO_2]}\right) = C$$

where [M] is the hydrocarbon monomer concentration and [$SO_2$] is the sulfur dioxide concentration. For example, where the polysulfone is a copolymer of a conjugated diene and sulfur dioxide or a terpolymer of butadiene and another conjugated diene at $-20°$ C., $C \approx$ or $$\mathrm{Log}\left(\frac{[M]}{[SO_2]}\right) \approx 3$$

and for about every 40° C. increase in reaction temperature the value of C is approximately halved. The maximum allowable [$SO_2$] increases with increase in polymerization temperature.

The polymerization reactions whereby the unsaturated polysulfones are prepared are catalyzed by a free radical initiator such as peroxides, azo compounds or inorganic oxidizing agents which react with sulfur dioxide to yield a redox initiator system. Some specific examples include hydrogen peroxide, benzoyl peroxide, cumene hydroperoxide, di-tert-butyl-peroxide, ascaridole, tert-butyl hydroperoxide, acetyl peroxide, paracetic acid, silver nitrate, lithium nitrate, ammonium nitrate, as well as chlorates, perchlorates, nitrites, persulfates, trimethylamine oxide, dimethylaniline oxide, perchloric, nitric and nitrous acids, diisobutylene ozonide, azobisisobutyronitrile, etc. These catalyst may be present in amounts between about 0.0001% and 5% and preferably between about 0.001% and 1.0% by weight.

One of the methods which may be used for polymerizing the monomers is emulsion polymerization. By this method, polymerization takes place in an aqueous medium with the aid of emulsifying agents. The monomeric hydrocarbon reactants are present almost entirely as emulsion or suspension droplets dispersed in the continuous phase.

The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples include the alkali metal salts of $C_{12}$ to $C_{18}$ straight chain carboxylic acids, e.g., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

Another method of preparing unsaturated polysulfones is by polymerizing in the presence of a suitable solvent in which the polymers are soluble or at least swollen. Since in order to effectively hydrogenate the unsaturated precursors they must first be placed in solution or at least swollen, this provides an efficient method by which the unsaturated polymer may be prepared and then directly hydrogenated without separation from the polymerization mixture. Suitable solvents are those used in the hydrogenation phase as mentioned below.

The polysulfones of this invention may also be prepared by reacting sulfur dioxide with a diolefin hydrocarbon monomer in the monomer medium itself. In this method, no additional diluents, solvents or agents are necessary thereby greatly increasing the ease by which the unsaturated polymers are recovered. Sulfur dioxide and catalyst are simply added to the hydrocarbon monomer. An additional advantage of this method is that it is very easy here to maintain the desired high ratio of hydrocarbon monomer to sulfur dioxide in this system.

A variation of the hydrocarbon monomer media method is accomplished by adding to a diolefin monomer feed sulfolene or a substituted 3-sulfolene corresponding to the monomer, and heating. 3-sulfolene and its hydrocarbon substituted derivatives decompose at elevated temperatures to yield sulfur dioxide and a diene. 3-sulfolene itself (thiacyclopentene-1,1-dioxide) decomposes a butadiene and $SO_2$. Thus, the appropriate amount of sulfolene may be added to a diene monomer such that when the sulfolene decomposes the sulfur dioxide concentration is within the range which will produce the polysulfones of the invention. Heating these sulfolenes alone in the absence of additional diene similarly produces polysulfones of this invention. The temperatures at which 3-sulfolenes decompose are between about 70° and 150° C.

The unsaturated polysulfones of this invention have, as previously stated, a structure characterized by the repeating unit $(M_n\text{—}SO_2)$. In this structure, M is a hydrocarbon unit derived solely from a single monomer. The monomer employed in the charge may be conjugated diolefin or a 3-sulfolene or a mixture of a diolefin and the corresponding sulfolene.

It appears, but has not been conclusively proved, that the first diolefin hydrocarbon monomer unit M enters the reaction predominantly by 1,4-addition and additional units M enter in a distribution typical of free-radical polymerization of diolefins. Polymers of this invention have been found to have less than 20% 1,2-structure, less than 20% cis-1,4 structure and over 60% trans-1,4 structure. Typical microstructures are 10–15% 1,2-; 10–15% cis-1,4- and 70–80% trans-1,4-.

The unsaturated polysulfones of this invention can be described as having a structure $(M_nSO_2)$ wherein $n$ is a number, the average of which in a single polymer molecule is greater than 1.2 and M is the combined form of a single conjugated diene of from 4 to 8 carbon atoms per molecule and having one ethylenically unsaturated site per diene unit, at least about 80% of said unsaturated sites being present in the polymer chain or backbone.

The polysulfones recovered from the polymerization reaction to be hydrogenated are placed in a suitable hydrogenation solvent. Such a solvent is one in which the unsaturated polymer is soluble or at least swollen. Suitable solvents include sulfolane, perfluoro-alcohols such as perfluoroethanol, perfluoroisopropanol, etc., and phenolic solvents such as phenol, m-cresol, p-chlorophenol and the like. One of the advantages of the novel polysulfones of the invention is their increased solubility over the equimolar alternates of polysulfones known heretofore. This feature is particularly important in the polymers containing a high proportion of butadiene. For example, the alternate equimolar butadiene polysulfone is insoluble at 100° C. in solvents such as dimethylformamide, sulfolane and p-chlorophenol. Because of this, hydrogenation of such 1:1 polymers proceeds with great difficulty. However, butadiene-sulfur dioxide copolymers of this invention containing over about 1.2 butadiene units per sulfone group are moderately soluble and those containing over 1.3 butadiene units per molecule are readily soluble in such solvents and easily hydrogenated.

Hydrogenation of the unsaturated polysulfones in solution takes place at temperatures between about 20° C. and 200° C. in the presence of a hydrogenation catalyst. Such a catalyst may be heterogeneous or homogeneous. Suitable heterogeneous catalyst include, for example, platinum, rhodium, osmium, ruthenium, iridium, palladium, rhenium, nickel cobalt, copper, chromium, iron and compounds thereof such as oxides, sulfides, carbonyls, etc. These catalysts may be used alone or supported on a relatively inert material such as carbon, diatomaceous earth, alumina, silica, asbestos, pumice, etc. In order to achieve more efficient hydrogenation, it may be necessary to keep the heterogeneous catalysts dispersed throughout the polymer-containing solution such as by stirring the reaction mixture or agitating the reaction vessel. Amounts of catalyst between about 0.01 and 10% and preferably between about 0.1 and 5% by weight based on the polymer may be used.

Homogeneous catalysts offer the advantages of being rapidly dispersed throughout the reaction medium and of being less readily poisoned, thus permitting the hydrogenation of polysulfones which are only swollen by the solvent. Such homogeneous catalysts include among others the rhodium systems disclosed in co-assigned copending application Ser. No. 417,482, filed Dec. 10, 1964, the descriptions of which are incorporated herein by reference. Preferred catalysts of this type are rhodium halide complexes such as trichlorotris(triphenylarsine)rhodium (III) and chlorotris(triphenylphosphine)rhodium (I). The amount of catalyst used is sufficient to provide from about 50 to 2000 p.p.m. and preferably from 100 to 1000 p.p.m. rhodium based on the polymer.

Although hydrogenation would proceed slowly at one atmosphere of hydrogen pressure, it is normally desirable to use a large excess of hydrogen and thus hydrogen pressures of up to 10,000 p.s.i. or higher may be used; the preferred range is between about 500 and 2000 p.s.i. The hydrogen may be bubbled through the polymer-containing solution or slurry of swollen polymer or may be charged into a closed reaction vessel under pressure and then mixed with the solution by suitable means. The hydrogenation of the unsaturated polysulfones by the method as disclosed herein only affects the ethylenic unsaturation and does not in any way reduce the stable sulfone portion of the polymers or the aromatic unsaturation.

Although for some products, complete hydrogenation may be desirable it is not necessary since any degree of hydrogenation of the original ethylenic unsaturation above about 50% results in highly stable and high melting polymers. In the case of highly crystalline polysulfones, it is found above about 50% that the degree of hydrogenation may be varied without greatly sacrificing the crystallinity. The hydrogenated polymers have molecular weights of between about 20,000 and 1,000,000 as characterized by intrinsic viscosity of from about 0.5 to 5.5 dl./g. determined in a 1:1 mixture of m-cresol and p-chlorophenol at 25° C.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts disclosed in the examples are given by weight.

EXAMPLE I

Butadiene (2730 grams—51 moles) was placed in a reaction vessel to which also was added t-butyl hydroperoxide catallyst. A total of 124.0 grams of sulfur dioxide (1.9 moles) was added to the reaction mixture which was maintained at about 32° C. throughout the reaction. Two-thirds of the sulfur dioxide was added at the beginning of the polymerization reaction and the remaining third added in three equal amounts at 15 minute intervals. The amount of catalyst used was 1.4 grams which was added to the reaction mixture in nine equal portions at about 6 minute intervals. The total reaction time was 60 minutes. The unsaturated polysulfone recovered contained 24.2% sulfur by weight. Analysis indicated about 1.2 butadiene derived units per sulfone group. The polymer was soluble in p-chlorophenol at 100° C.

EXAMPLE II

Ten grams of sulfur dioxide (0.15 mole) and 0.18 gram of t-butyl hydroperoxide were initially added to a reactor containing 1240 grams (23 moles) of butadiene. The reaction temperature was about 42° C. During the reaction about 0.29 g. of sulfur dioxide and 5.8 mg. of catalyst in a methanol solution were added per minute. The total reaction time was about 170 minutes after which the polymer containing 22.8% sulfur was recovered.

The polymer possessed an intrinsic viscosity of 1.4 dl./g. in a 50–50 solution of m-cresol and p-chlorophenol at room temperature. Analysis showed the polymer to contain 1.4 butadiene derived units per sulfone group. A substantial number of $C_8$ fragments was identified by chromatography of the pyrolysis product of the polymer. The polymer is soluble in dimethylformamide, sulfolane and p-chlorophenol at room temperature.

A portion of the recovered polymer (10 grams) was added to 40 ml. of p-chlorophenol in which it was soluble. The solution was placed in an autoclave to which was added 0.030 grams of chlorotris(triphenyl-phosphine) rhodium (I) and 0.30 g. triphenylphosphine. The vessel was purged with hydrogen and then pressurized with hydrogen to 1122 p.s.i. The reaction mixture was heated to about 130° C. for 40 hours after which the hydrogenated polymer was recovered by working up the reaction mixture with methanol. The polymer was completely saturated as shown by infrared analysis and contained the same ratio of butadiene units: $SO_2$ as did the unsaturated polymer.

EXAMPLE III

To a reactor containing 600 grams of butadiene (11 moles) 1.0 liter of water, 5.0 grams of sodium lauryl sulfate, 5.0 grams of $(NH_4)_2S_2O_8$ and 0.3 grams of 2,6-di-tert-butyl-4-methylphenol antioxidant was added a total of 46.5 grams of sulfur dioxide (0.7 mole), 10 grams being added initially and thereafter about 0.2 g./minute. The reaction mixture was maintained at about 27° C. for 180 minutes after which the polymer was recovered. Analysis showed the polymer to contain 24.4% sulfur and about 1.2 butadiene derived units per sulfone group.

EXAMPLE IV

Butadiene (3 grams) and 3-sulfolene (3 grams) were heated for 3 days at 75° C. and 16 hours at 100° C. in the presence of di-t-butyl peroxide. The unsaturated polysulfone recovered contained 16.7% sulfur corresponding to 2.4 butadiene derived units per sulfone group. The polymer is soluble in sulfolane at room temperature.

EXAMPLE V

Butadiene (275 grams) and 3-sulfolene (1929 grams) were mixed and heated to about 85° C. for 10 hours in the presence of di-t-butyl peroxide. The polymer obtained possessed 1.8 butadiene derived units per sulfone group with a sulfur content of 20.4%.

Analysis showed 10–15% of the double bonds present in 1,2-position, the remainder in 1,4-position.

5.0 grams of the recovered polymer was mixed with 1.0 g. triphenylphosphine, 0.10 g. tris(triphenylarsine)rhodium trichloride and 200 ml. of m-cresol and sealed in a 300 ml. autoclave which was flushed with hydrogen. The reactor was heated for 66 hours at 100° C. under hydrogen at 1000 p.s.i. with stirring. The resulting polymer showed no unsaturation by infrared or N.M.R. analysis and possessed an intrinsic viscosity of 2.8 dl./g. at 25° C. in 50:50 m-cresol:p-chlorophenol. The hydrogenated polymer had a birefringent melting point of 160° C. was stable to temperatures near 400° C.

EXAMPLE VI 194 grams of 3-sulfolene (1.64 moles) in admixture with 4 grams of di-t-butyl peroxide was heated at 100° C. for 4 hours. The polysulfone recovered contained about 1.6 butadiene derived units per sulfone group.

We claim as our invention:

1. A polysulfone having
   (a) a structure in which the repeating unit is $$(-M_nSO_2-)$$

wherein M is the hydrocarbon unit derived from the enchainment of a single conjugated diene of from 4 to 8 carbon atoms per diene unit and having one ethylenically unsaturated site per diene unit and $n$ is a number, the average of which in a single polymer molecule is greater than 1.2, at least 80% of said unsaturated sites being present in the polymer backbone, and
   (b) a molecular weight between about 20,000 and about 1,000,000.

2. A polysulfone according to claim 1 wherein M is the combined form of butadiene-1,3 and $n$ is between 1.3 and 20.

3. A hydrogenated polysulfone having
   (a) a structure in which the repeating unit is $$(-M_nSO_2-)$$

wherein M is the hydrocarbon unit derived from the enchainment of a single conjugated diene unit of from 4 to 8 carbon atoms per diene unit having in the unhydrogenated state one ethylenically unsaturated site per diene unit, with at least 80% of said unsaturated sites being in the polymer backbone and $n$ is a number, the average of which in a single polymer molecule is greater than 1.2, and
   (b) a molecular weight between about 20,000 and about 1,000,000, and
   (c) a residual unsaturation of less than about 50%.

4. A hydrogenated polysulfone according to claim 3 wherein M is the combined form of butadiene-1,3 and $n$ is between 1.3 and 20.

5. A hydrogenated polysulfone according to claim 4 wherein said residual unsaturation is substantially zero.

References Cited

UNITED STATES PATENTS

| | | | |
|---|---|---|---|
| 2,625,525 | 1/1953 | Lynch | 260—79.3 |
| 2,645,631 | 7/1953 | Crouch | 260—79.3 |
| 2,943,077 | 6/1960 | De Jong | 260—79.3 |
| 3,336,273 | 8/1967 | Youngman et al. | 260—79.3 |
| 3,444,145 | 5/1969 | Youngman et al. | 260—79.3 |

JAMES A. SEIDLECK, Primary Examiner

U.S. Cl. X.R.

260—96